United States Patent [19]
Goddard

[11] Patent Number: 5,486,017
[45] Date of Patent: Jan. 23, 1996

[54] PNEUMATIC SUSPENSION SYSTEM DAMPENER

[76] Inventor: Franklin S. Goddard, 3111 S. Apache, Amarillo, Tex. 79103

[21] Appl. No.: 381,652

[22] Filed: Jan. 31, 1995

[51] Int. Cl.⁶ .......................... B60G 11/30; B60G 15/12
[52] U.S. Cl. .................. 280/711; 267/64.23; 267/64.24; 267/122
[58] Field of Search .................................. 280/711, 713, 280/708, 712, 702; 267/64.23, 64.24, 64.15, 64.19, 64.21, 122

[56] References Cited

U.S. PATENT DOCUMENTS

| | | |
|---|---|---|
| 2,971,772 | 2/1961 | Tantlinger et al. . |
| 2,984,501 | 5/1961 | Mercier . |
| 3,025,076 | 3/1962 | Davies et al. ............................ 280/713 |
| 3,148,871 | 9/1964 | Wilkins et al. . |
| 3,149,830 | 9/1964 | Broadwell . |
| 3,168,278 | 2/1965 | Ogden .................................. 267/64.24 |
| 5,052,712 | 10/1991 | Raidel .................................... 280/711 |

Primary Examiner—Margaret A. Focarino
Assistant Examiner—Peter C. English
Attorney, Agent, or Firm—Richard C. Litman

[57] ABSTRACT

An apparatus to dampen a vehicle pneumatic suspension system wherein high impulse road vibration is transmitted from the pneumatic suspension elements of a vehicle's wheel assembly to a serially arranged variable-volume chamber and biased damper, such that the high pressure impulse is absorbed by gas compression and damper displacement. The biasing element of the damper returns the damper back to a normal position, which returns the displaced gas volume back into the pneumatic suspension system.

8 Claims, 2 Drawing Sheets

PNEUMATIC SUSPENSION SYSTEM DAMPENER

BACKGROUND OF THE INVENTION

1. Field of the Invention

This invention relates to vehicle pneumatic suspension systems, specifically a pneumatic suspension system dampener which promotes absorption of high impulse road shocks and vibrations and promotes a smoother ride when driving over rough road conditions.

2. Description of the Prior Art

Pneumatic suspension systems are not novel, but associated system dampeners are. Conventional pneumatic suspension systems include pneumatic suspension elements, typically variable-volume chambers, mounted between the vehicle's wheel assemblies and chassis, which are pressurized by a compressor via fluid conduit. When a vehicle's wheel assembly experiences rough road conditions, shocks and vibrations are imparted to its pneumatic suspension elements which compress the gas contained therein. Gas compression is limited to a critical point where forces generated by inertia and vehicle weight are equal to or less than the gas pressure within the elements, referred to herein as "bottoming out." When a pneumatic suspension element has bottomed out, any additional force transmitted to the element will be substantially transmitted to the vehicle, passengers and cargo. Conventional systems, unlike the present invention, fail to provide vehicle passengers and cargo relief from road shocks which may lead to passenger injury and/or cargo damage.

The prior art encompasses different configurations of pneumatic suspension systems.

U.S. Pat. No. 2,971,772 issued Feb. 14, 1961 to K. W. Tantlinger et al. describes a suspension system comprising dual variable-volume chambers symmetrically mounted about an axle of the vehicle on a member pivotally mounted to the axle such that the member may see-saw about the axle. Tantlinger's invention fails to provide a means to relieve the suspension system's pneumatic elements of the impulses which are ordinarily transmitted to the vehicle passengers and cargo when the suspension elements bottom out.

U.S. Pat. No. 2,984,501 issued May 16, 1961 to P. E. Mercier describes a suspension system comprising a piston which pumps liquid from a cylinder into: (1) in cases where pumping is slow, a resilient toroidal chamber containing an adjustably gas-pressurized toroidal variable-volume chamber; or (2) in cases where pumping is rapid, a significantly larger hemispherical chamber containing an adjustably gas-pressurized hemispherical variable-volume chamber. Although Mercier's invention does include a biased damper in series with pneumatic variable-volume chambers for shock absorption as in the present invention, Mercier's invention focusses on absorbing shocks directly from the wheel assembly rather than relieving the suspension system's pneumatic elements of the impulses which are ordinarily transmitted to the vehicle passengers and cargo when the suspension elements bottom out. Additionally Mercier's invention is not in communication with the pneumatic suspension system.

U.S. Pat. No. 3,148,871 issued Sep. 15, 1964 to D. B. Wilkins et al. describes a suspension system comprising a piston which pumps liquid from a cylinder into the first half of a chamber which has a membrane separating the liquid from pressurized gas stored in the second half of the chamber. U.S. Pat. No. 3,149,830 issued Sep. 22, 1964 to R. J. Broadwell describes a similar suspension system comprising a piston which pumps liquid from a cylinder into the cylinder jacket which has an opened end which is sealed by a folding seal which separates the liquid from a chamber charged with air. As with Mercier's invention above, Wilkins' and Broadwell's inventions do not relieve the suspension system's pneumatic elements of the impulses which are ordinarily transmitted to the vehicle passengers and cargo when the suspension elements bottom out and do not tie into the pneumatic suspension system.

None of the above inventions and patents, taken either singly or in combination, is seen to describe the instant invention as claimed.

SUMMARY OF THE INVENTION

The present invention is an apparatus to dampen a pneumatic suspension system commonly employed on, but not limited to, semi tractor-trailer vehicles. The dampening apparatus encourages absorption of shock energy ordinarily transmitted to vehicle passengers and cargo when the vehicle suspension system "bottoms out," when pneumatic elements of the pneumatic suspension system are at or beyond the critical pressure where forces generated by inertia and vehicle weight are equal to or less than the gas pressure within the elements. At or beyond this critical pressure, shock impulses are substantially transmitted to the vehicle passengers and cargo. To avoid the harmful effects of these unmitigated transmitted impulses, the invention routes the volume of gas associated with the super-critical impulse to a variable-volume chamber which is in contact with a damper and return spring. The impulse compels the chamber to expand against the damper thus permitting a less severe shock to be transmitted to the vehicle. After the impulse has subsided, the return spring urges the dampener back to its original position which returns the gas back into the system and urges the wheel assemblies to return to their design attitudes.

In consideration of the above, an object of the invention is to dampen the impulses which would ordinarily be transmitted to the vehicle passengers and cargo when a conventional pneumatic suspension system is at or above full pressurization with a serially arranged air bag and dampener system.

Another object of the invention is to provide a dampening system which may be adjusted for the amount of dampening desired for the pneumatic suspension system.

Yet another object of the invention is to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
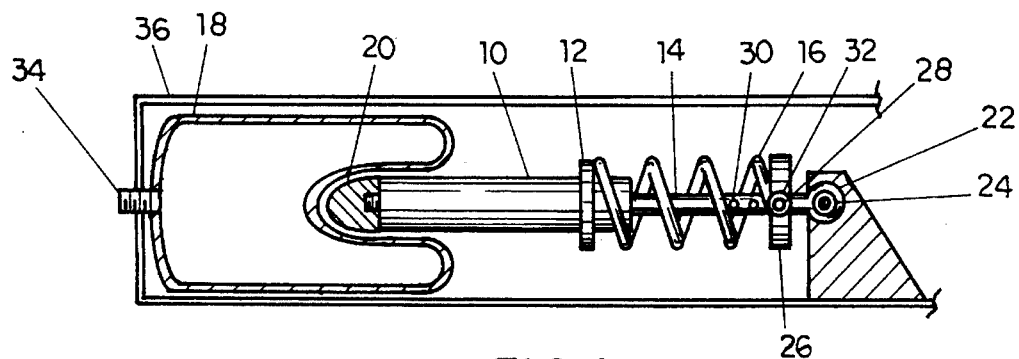
FIG. 1 is schematic view of an embodiment of the invention including a variable-volume chamber, damper, return spring, vehicle mounts and communication with a vehicle's pneumatic suspension system.
Figure 3:
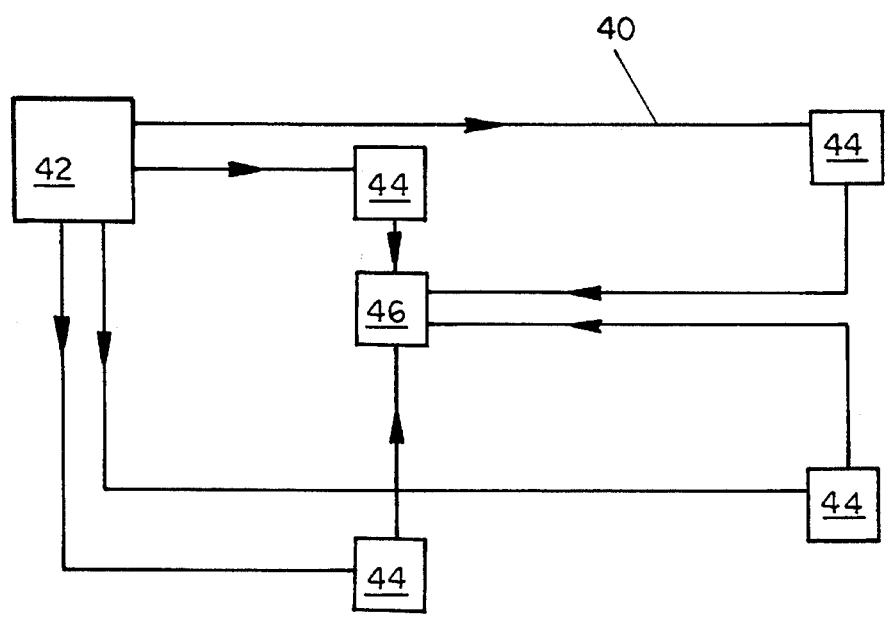
FIG. 3 is a diagrammatic view of an embodiment of the invention including a vehicle's compressor and wheel assemblies wherein all wheel assemblies feed into a pneumatic suspension damping apparatus.
Figure 4:
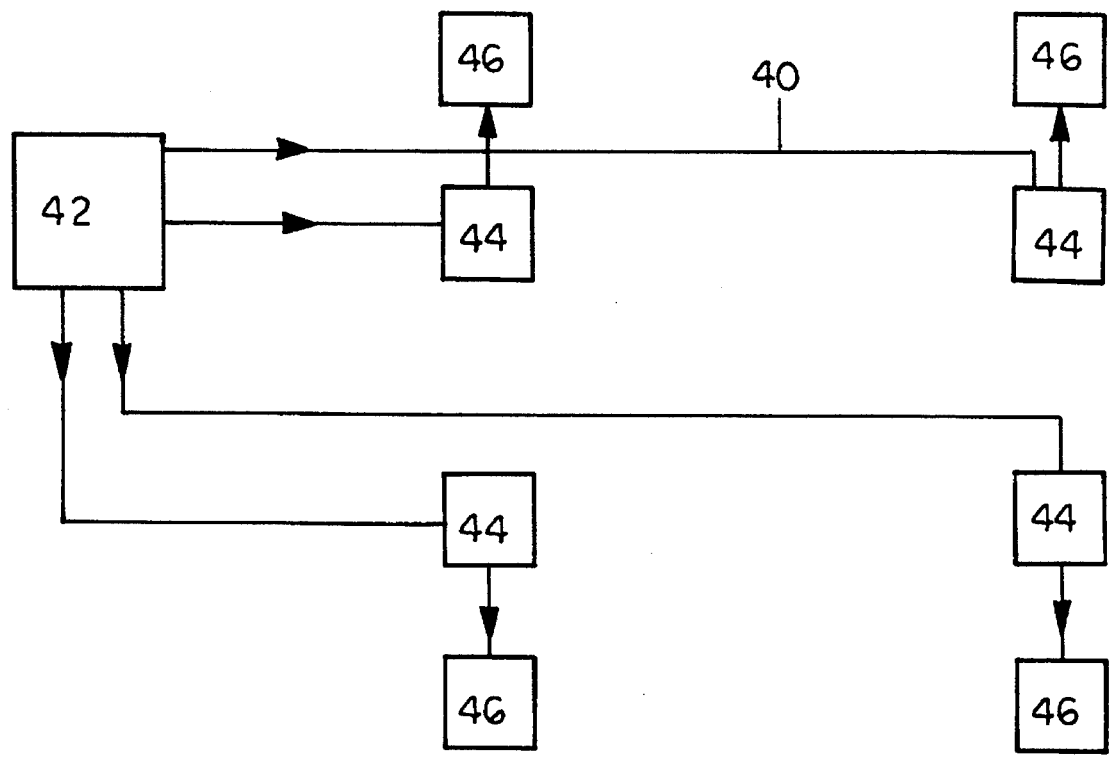
FIG. 4 is a diagrammatic view of an embodiment of the invention including a vehicle's compressor and wheel assemblies wherein each wheel assembly feeds into an individually designated pneumatic suspension damping apparatus.
Figure 5:
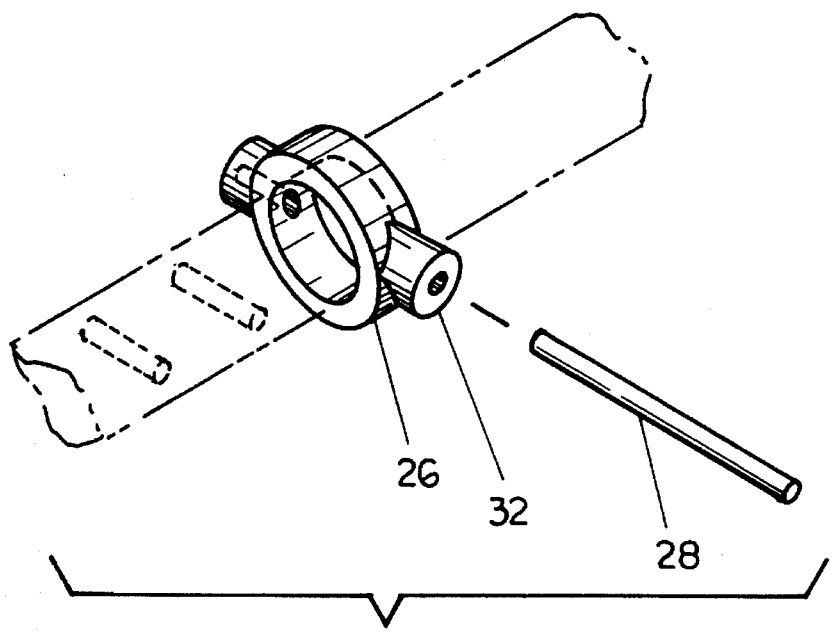
FIG. 5 is environmental perspective view of the adjustment washer and pin, the washer disposed about the piston rod here shown in broken line.

Referring to FIG. 1, an embodiment of the invention 46 is carried out with a conventional damper 10 which includes a radial flange 12, a piston rod 14, an adjustment washer 26 fixed relative to the piston rod 14 by a pin 28 and a spring 16 interposed between the radial flange 12 and the adjustment washer 26. The spring 16 biases the position of the piston rod 14 relative to the damper 10. The bias may be adjusted by sliding the adjustment washer 26 freely over the piston rod 14, and then fixing its position relative to the piston rod 14 by sliding a pin 28 through a sleeve 32 transverse to the central axis of the aperture of the adjustment washer 26 and any number of adjustment holes 30 bored in the piston rod 14 transverse to its central axis. The piston rod 14 has an eye 22 which is rigidly attached to a vehicle mount 24. The damper 10 has a threaded segment to engage a bullet-shaped adaptor which is adhered to the outer surface of one end of a variable-volume chamber 18. The variable-volume chamber 18 is retained within a variable-volume chamber receiver 36. The variable-volume chamber 18 includes a valve 34 which, referring to FIG. 3, provides communication with the pneumatic elements (not shown) of all of the wheel assemblies 44 which are initially pressurized by a conventional compressor 42. FIG. 4 shows an alternative embodiment wherein an embodiment of the invention 46 is in communication with an individual wheel assembly 44.

When a vehicle encounters rough road conditions, the wheel assemblies 44 experience shocks and vibrations. These shocks are transmitted to the pneumatic suspension elements for the wheel assembly 44, typically variable-volume chambers. Gas compression within the pneumatic suspension elements will absorb most of the ordinary shock energy generated by moderately rough road conditions. However, prior to this invention 46, when a wheel assembly endured intense rough road conditions, the pneumatic suspension elements became over-pressurized, or "bottomed out." Bottomed out pneumatic suspension elements are not able to absorb the high pressure impulses created by these excessive shocks and vibrations, but transmit the impulses to the vehicle passengers and cargo.

The present invention 46 absorbs these high pressure impulses by routing the volume of gas commensurate with the compression caused by the super-critical impulse to a variable-volume chamber When this variable-volume chamber be becomes highly pressurized, it expands against a damper 10 which absorbs the impulse energy. After the impulse has subsided, the biasing spring 16 associated with the damper be returns the damper 10 back to its normal position which returns to the pneumatic suspension elements the gas expelled due to the impulse.

Figure 2:
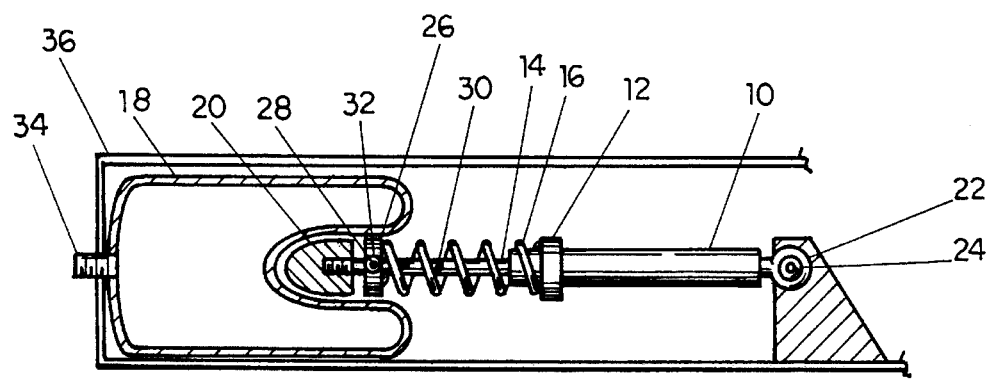
FIG. 2 is schematic view of an embodiment of the invention including a variable-volume chamber, return spring, vehicle mounts and communication with a vehicle's pneumatic suspension system wherein the dampener is reversed.

FIG. 2 shows an alternative embodiment of the invention 46 wherein the damper 10 has been reversed. The piston rod 14 has a threaded segment to engage the bullet-shaped adaptor 20 adhered to the variable-volume chamber be. The damper 10 includes an eye 22 which rigidly attaches to the vehicle mount 24.

The present invention is not intended to be limited to the embodiments described above, but to encompass any and all embodiments within the scope of the following claims.

I claim:

1. In a vehicle pneumatic suspension system including pneumatic suspension elements which absorb road shocks and vibrations for a wheel assembly, the improvement comprising:
   a damper including,
      a cylinder containing fluid and having a first end and a second end and an inner and an outer surface, said cylinder including a radial flange disposed about said cylinder outer surface,
      a piston disposed within said cylinder having an axial bore interposed between a first and a second surface, said piston defining within said cylinder a first and a second volume, said axial bore providing fluid communication between said first and second volumes,
      a piston rod interposed between said piston and a first vehicle mount and sealingly extending through an axial bore through said first end of said cylinder, said piston rod having a plurality of transverse holes disposed within that portion of said piston rod external to said cylinder,
      a washer disposed about said piston rod having a transverse sleeve through which a pin may be received, said pin also being received in a selected one of said transverse holes disposed within said piston rod, and
      a spring having a first end fixed relative to said radial flange disposed about said cylinder outer surface and a second end fixed relative to said washer disposed about said piston rod, wherein said spring biases said piston rod to a normal position relative to said cylinder; and
   a variable-volume chamber having a first outer surface fixed to a second vehicle mount and a second outer surface fixed to said second end outer surface of said cylinder of said damper, said variable-volume chamber including a valve which provides communication with the pneumatic suspension elements which absorb road shocks and vibrations for a wheel assembly whereby,
   a shock experienced by a vehicle wheel assembly is transmitted from the wheel assembly's pneumatic suspension elements to said variable-volume chamber and is absorbed by gas compression within said chamber and by said variable-volume chamber expanding against said second end outer surface of said cylinder which overcomes said biasing force on said piston rod and compresses said fluid in said cylinder and causes said fluid to flow through said axial bore disposed within said piston, said spring returning said damper to a normal position relative to said cylinder once the pressure impulse has subsided.

2. The improvement according to claim 1 wherein a bullet-shaped cap is interposed between said second outer surface of said variable-volume chamber and said second end outer surface of said cylinder of said damper.

3. The improvement according to claim 1 wherein said valve of said variable-volume chamber provides communication with the pneumatic suspension elements for all wheel assemblies.

4. An air ride dampening apparatus for use on vehicles equipped with a pneumatic suspension element, said apparatus comprising:

a damper including,
  a piston,
  a piston rod extending from said piston, and
  a cylinder containing said piston with said piston rod extending through an end of said cylinder;

a spring having a first end attached to said cylinder and a second end attached to said piston rod; and a variable-volume chamber in fluid communication with the pneumatic suspension element, said variable-volume chamber attached to said damper.

5. The apparatus according to claim 4 wherein said damper further includes a bullet-shaped cap interposed between said variable-volume chamber and said damper.

6. The apparatus according to claim 1 wherein said variable-volume chamber is in fluid communication with a plurality of pneumatic suspension elements.

7. In a vehicle pneumatic suspension system including pneumatic suspension elements which absorb road shocks and vibrations for a wheel assembly, the improvement comprising:

a damper including,
  a cylinder containing fluid and having a first end, a second end, an inner surface, and an outer surface, said second end of said cylinder anchorable to a vehicle mount, said cylinder including a radial flange disposed about said cylinder outer surface,
  a piston disposed within said cylinder having an axial bore interposed between a first and a second surface, said piston defining within said cylinder a first and a second volume, said axial bore providing fluid communication between said first and second volumes,
  a piston rod having a first rod end attached to said piston and a second rod end, said piston rod sealingly extending through an axial bore through said first end of said cylinder, said piston rod having a plurality of transverse holes disposed within that portion of said piston rod external to said cylinder,
  a washer disposed about said piston rod having a transverse sleeve through which a pin may be received, said pin also being received in a selected one of said transverse holes disposed within said piston rod, and
  a spring having a first end fixed relative to said radial flange disposed about said cylinder outer surface and a second end fixed relative to said washer disposed about said piston rod, wherein said spring biases said piston rod to a normal position relative to said cylinder; and a variable-volume chamber having a first outer surface anchorable to a second vehicle mount and a second outer surface fixed to said second rod end of said piston rod, said variable-volume chamber including a valve which provides communication with the pneumatic suspension elements which absorb road shocks and vibrations for a wheel assembly; whereby, a shock experienced by a vehicle wheel assembly is transmitted from the wheel assembly's pneumatic suspension elements to said variable-volume chamber and is absorbed by gas compression within said chamber and by said variable-volume chamber expanding against said piston rod which overcomes said biasing force on said piston rod and compresses said fluid in said cylinder and causes said fluid to flow through said axial bore disposed within said piston, said spring returning said damper to a normal position relative to said cylinder once the pressure impulse has subsided.

8. The improvement according to claim 7 wherein a bullet-shaped cap is interposed between said second outer surface of said variable-volume chamber and said piston rod.

* * * * *